United States Patent
Nazar et al.

(10) Patent No.: US 9,075,963 B2
(45) Date of Patent: Jul. 7, 2015

(54) SYSTEMS AND METHODS FOR GENERATING AND DISPLAYING AN INTELLECTUAL PROPERTY RIGHTS PROFILE FOR A MEDIA PRESENTATION

(75) Inventors: Richard Nazar, Berkeley Heights, NJ (US); Richard Toomey, Old Bridge, NJ (US); Julia Goodwin, Weehawken, NJ (US); Dmitriy Donskoy, Rego Park, NY (US); Rama Rao Miryala, East Rutherford, NJ (US); Brian Doherty, Massapequa, NY (US); Charles Wright, New York, NY (US); Neil Cohen, Riverdale, NY (US); Liz Soriano, New York, NY (US); Lisa O'Neil, New York, NY (US); Dawn Porter, Montclair, NJ (US); Tom Kaniewski, New York, NY (US); Maggie-Reilly Brooks, Scarsdale, NY (US); James Ryan, New York, NY (US); Adrienne Britton, Brooklyn, NY (US); Cleveland Barclay, New York, NY (US); Gloria Spencer, New York, NY (US)

(73) Assignee: A&E Television Networks, New York, NY (US)

( * ) Notice: Subject to any disclaimer, the term of this patent is extended or adjusted under 35 U.S.C. 154(b) by 857 days.

(21) Appl. No.: 12/471,105

(22) Filed: May 22, 2009

(65) Prior Publication Data

US 2010/0070522 A1 Mar. 18, 2010

Related U.S. Application Data

(60) Provisional application No. 61/055,389, filed on May 22, 2008.

(51) Int. Cl.
 *G06F 17/30* (2006.01)
 *G06F 21/10* (2013.01)
 *G06Q 10/10* (2012.01)

(52) U.S. Cl.
 CPC ...... *G06F 21/105* (2013.01); *G06F 2221/2101* (2013.01); *G06Q 10/10* (2013.01)

(58) Field of Classification Search
 None
 See application file for complete search history.

(56) References Cited

U.S. PATENT DOCUMENTS

| | | | | |
|---|---|---|---|---|
| 5,903,904 A | * | 5/1999 | Peairs | 715/209 |
| 5,991,876 A | * | 11/1999 | Johnson et al. | 726/28 |
| 7,386,460 B1 | * | 6/2008 | Frank et al. | 705/310 |
| 2002/0099679 A1 | * | 7/2002 | Usitalo et al. | 706/46 |
| 2004/0001106 A1 | * | 1/2004 | Deutscher et al. | 345/838 |
| 2004/0091234 A1 | * | 5/2004 | Delorme et al. | 386/46 |
| 2006/0047701 A1 | * | 3/2006 | Maybury et al. | 707/104.1 |
| 2006/0271519 A1 | * | 11/2006 | Blackwood et al. | 707/3 |
| 2007/0300256 A1 | * | 12/2007 | Coomer et al. | 725/44 |
| 2008/0040340 A1 | * | 2/2008 | Varadarajan et al. | 707/5 |
| 2009/0183217 A1 | * | 7/2009 | Mukerji et al. | 725/110 |
| 2009/0199254 A1 | * | 8/2009 | White et al. | 725/110 |
| 2009/0271425 A1 | * | 10/2009 | Le Gall et al. | 707/101 |

* cited by examiner

*Primary Examiner* — Jay Morrison
(74) *Attorney, Agent, or Firm* — Dentons US LLP

(57) ABSTRACT

A system, computer readable media, GUI, and apparatus are provided that are configured to generate and display an intellectual property rights profile for a media presentation. Information to be included in an intellectual property rights profile may be entered into a provided data entry template by, for example, a user or administrator of the media presentation. Uploaded documents may be added to an intellectual property rights profile and later accessed by a subsequent user. In some cases, a status, for example, complete or incomplete, may be determined for an intellectual property rights profile and an action may be initiated based on the status.

31 Claims, 16 Drawing Sheets

SYSTEMS AND METHODS FOR GENERATING AND DISPLAYING AN INTELLECTUAL PROPERTY RIGHTS PROFILE FOR A MEDIA PRESENTATION

CROSS REFERENCE TO RELATED APPLICATIONS

The present application claims the benefit of U.S. Provisional Application Ser. No. 61/055,389 filed on 22 May 2008, which is incorporated herein by reference in its entirety.

FIELD OF THE INVENTION

The application generally relates to the field of intellectual property rights profiles.

BACKGROUND OF THE INVENTION

Traditional intellectual property rights profiles for media presentations generally consist of paper binders containing relevant intellectual property rights information for a given media presentation. These paper binders are sometimes called "rights bibles" by those in various industries, such as television production. A typical intellectual property rights profile may include documents related to all aspects of a media presentation that may be protected by various intellectual property laws, most commonly, copyright laws. For example, an intellectual property rights profile for a movie production would include a script and all relevant paperwork demonstrating that, for example, the individual producing the movie owned the relevant intellectual property rights to do so. Also included in the exemplary intellectual property rights profile may be personal releases from all of the actors involved in the movie, documentation regarding all of the music for the movie, and so on. Thus, the size of an intellectual property rights profile generally depends on the size of its associated media presentation so that the larger the media presentation, the larger the intellectual property rights profile and the paper binder(s) to keep them in.

Keeping track of all of the paper documents required in an intellectual property rights profile for a media presentation, ensuring that they are correct and accurate, and that the intellectual property rights profile for a media presentation, or a portion thereof, is complete is a daunting and time consuming task. Paper intellectual property rights profiles also take up valuable storage space and are not easily transferable from one location to another. It is also difficult to share information between related paper intellectual property rights profiles and/or related media presentations.

BRIEF DESCRIPTION OF THE DRAWINGS

The present application is illustrated by way of example, and not limitation, in the figures of the accompanying drawings, in which:

FIGS. 4A-4B show an exemplary screen shot of a list of one or more media presentation for which a intellectual property rights profile may be generated, consistent with some of the embodiments of the present application;

FIGS. 4C-4D show exemplary screen shots of intellectual property rights data entry templates, consistent with some of the embodiments of the present application;

FIGS. 4G-4J show exemplary screen shots of reports for portions of an intellectual property rights profile for a media presentation, consistent with some of the embodiments of the present application;

SUMMARY OF THE INVENTION

Figure 1:
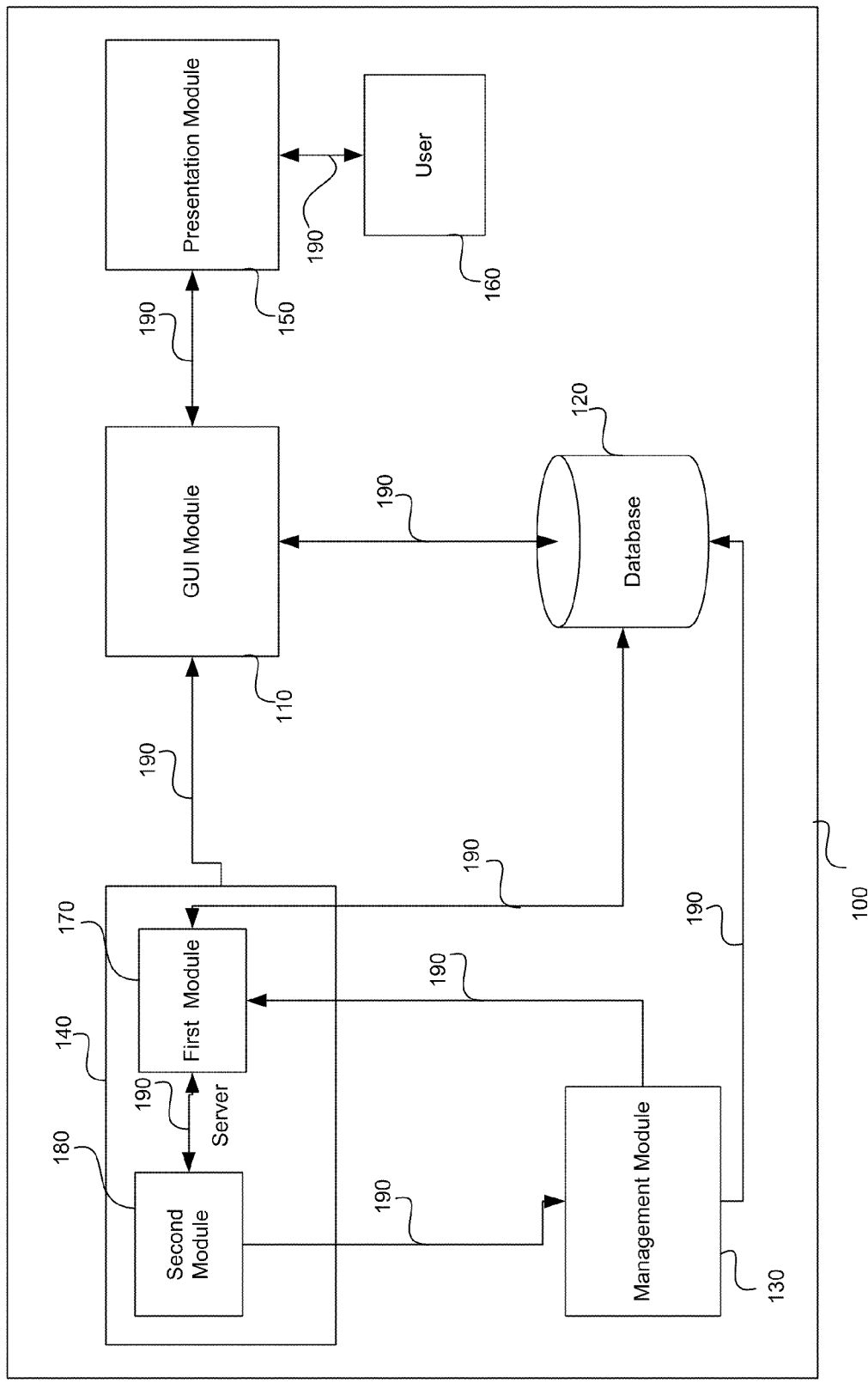
FIG. 1 shows a block diagram of an exemplary system for generating and/or displaying an intellectual property rights profile for a media presentation, consistent with some embodiments of the present application.

A system, computer readable media, GUI, and apparatus are provided wherein the system, computer readable media, GUI, and apparatus generate and display an intellectual property rights profile for a media presentation. The system and apparatus may include a graphical user interface (GUI) module, wherein the GUI module enables a user to interact with and enter intellectual property rights information about the media presentation and display a generated intellectual property rights profile of the media presentation. The system, GUI, and apparatus may also include a database module, readable by the graphical user interface module, wherein the database module stores intellectual property rights information about the media presentation and the generated intellectual property rights profile.

The system, computer readable media, GUI, and apparatus may further include an intellectual property rights management module, wherein the intellectual property rights module is coupled to the database and GUI modules, and the intellectual property rights module may process intellectual property for storage in the database module. A server module may also be included in the system, GUI, and apparatus. The server module may be communicatively coupled to the database module, the intellectual property rights management module, and the graphical user interface module, wherein the server may retrieve intellectual property rights information from the database module, process the intellectual property information and transmit the intellectual property information to the presentation module for presentation as an intellectual property profile. The system, GUI, and apparatus may further include a presentation module, communicatively coupled to the GUI module, for displaying a GUI facilitated by the GUI module to a user.

In some embodiments, a method for generating and displaying an intellectual property rights profile for a media presentation includes receiving, via a graphical user interface (GUI) module, a request to access a data entry template associated with the media presentation. The embodiment may further include retrieving, via the GUI module, the data entry template from a database, receiving, via the GUI module, data for the data entry template, sending, via the GUI module, the data to the database, and retrieving, via a server, the data of from the database. The embodiment may also include processing, via the server, the data to be compatible with an intellectual property rights management module and sending, via the server, the processed data to the intellectual property right management module.

The embodiment may further include processing, via the intellectual property rights management module, to generate the intellectual property rights profile of the media presentation, sending, via the intellectual property rights management module, the intellectual property rights profile to the server, sending, via the server, the intellectual property rights profile to the GUI module, and sending via the GUI module, the intellectual property rights profile to a presentation module. The intellectual property rights profile may the be displayed to a user via the presentation module.

In other embodiments, a method for generating and displaying an intellectual property rights profile for a media presentation includes displaying a list of at least one media presentation, wherein the list is specific to a user. The embodiment may also include receiving a selection of a media presentation, displaying an intellectual property rights data entry template associated with the selected media presentation, and receiving data entered into the intellectual property rights data entry template by the user. The embodiment may further include generating the intellectual property rights profile of the media presentation using the received data and displaying the intellectual property rights profile of the media presentation to the user.

The system and method according to an embodiment of the present application may also include providing a link to or coupling a copy of an intellectual property rights agreement to a corresponding intellectual property rights profile database record and/or providing such link or connection for access by the user via the GUI. This would enable the user to access the relevant agreement when reviewing the intellectual property rights profile and allow the system to be audited to ensure that all rights have been properly obtained. This is important in situations where the creator or person responsible for the media presentation is being compensated upon securing certain intellectual property rights for the media presentation and completion of the intellectual property rights profile.

The system and method according to an embodiment of the present application may also include providing a link or connectivity within the media presentation or a mock-up or pre-production outline of the media presentation to the intellectual property rights profile and/or the relevant agreements. This would allow for auditing of the media presentation and/ or for more efficient vetting of the media presentation.

Some embodiments may include a GUI wherein the GUI enables user interaction with intellectual property rights information for a media presentation and displays an intellectual property rights profile of the media presentation. The GUI may include an interactive list of media presentations wherein selecting a first media presentation from the list presents a first data entry field. The first data entry field may provide for entering intellectual property rights information about the first media presentation. The GUI may also include a first set of menu icons related to one or more aspects of the first media presentation, wherein selecting a first menu icon from the first set of menu icons presents a second data entry field. The GUI may further include a second icon, wherein selecting the second icon presents at least one of a view of a first portion of an intellectual property rights profile of the first media presentation. The GUI may still further include a third icon, wherein selecting the third icon provides access to a copy of a document comprising the first portion of the intellectual property rights profile of the first media presentation.

DETAILED DESCRIPTION

Described herein are systems, computer readable media, graphical user interfaces (GUIs), apparatus, and methods to facilitate the generation and display of an intellectual property rights profile for a media presentation. As will be apparent from the description below, various embodiments of the present application may be implemented with the aid of computer-implemented processes or methods (a.k.a. programs or routines) that may be rendered in any computer language. As an example, certain modules that comprise one instantiation of the present application may be written in extensible markup language (XML).

Where embodied as computer-readable instructions, the present application may be executed on a general-purpose computer. In such instances, the application may reside as a computer program stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 shows a block diagram of an exemplary system 100 for generating and/or displaying an intellectual property rights profile for a media presentation. The intellectual property rights profile may include, for example, a visual license, a music license, a personal release, a location release, a music cue list, a shot sheet, an errors and omissions certificate, a synopsis, a script, a credits list, and/or a lower thirds license and information relating to each of these items. The intellectual property rights profile may also include a product placement agreement and information relating thereto. It may also provide data regarding the status of the profile, an audit of the profile and the vetting of the information underlying the profile. The intellectual property rights profile may also include one or more links that provide a connection or access to the documents underlying and/or supporting the profile.

System 100 may include a graphical user interface (GUI) module 110, a database module 120, an intellectual property rights management module 130, a server module 140, a presentation module 150, a user 160, and/or a plurality of communication links 190. Optionally, server module 140 may include a first module 170 and a second module 180.

GUI module 110 may prepare one or more pages enabling a user, such as user 160, to interact with and/or enter intellectual property rights information about a media presentation. GUI module 110 may also prepare one or more pages enabling the user to view a generated intellectual property rights profile of a media presentation or a portion thereof. Exemplary pages prepared by GUI module 110 are provided in FIGS. 4A-4K. The pages prepared by GUI module 110 may be presented to a user, such as user 160, or an administrator (not shown) via presentation module 150.

Database module 120 may be readable by GUI module 110 through, for example, communication link 190. Database module 120 may store intellectual property rights information about one or more media presentations. Intellectual property rights information may include, for example, an intellectual property rights profile, information entered into an intellectual property information template, information uploaded to the database regarding intellectual property agreements and other agreements and/or information uploaded to the database regarding a media presentation. Database module 120 may also store a generated intellectual property rights profile generated for one or more media presentations.

Intellectual property rights management module 130 may be in communication with server 140 through one or more communication links 190. Intellectual property rights management module 130 may analyze intellectual property rights information for a media presentation and may generate an intellectual property rights profile for a media presentation. Exemplary intellectual property rights management module 130 include System 7 Universal Rights Management™ by Jaguar™ and RightsLogic™ by RSG Media™.

Server module 140 may be communicatively coupled to database module 120, intellectual property rights management module 130 and/or the graphical user interface module 110 through, for example, communication link 190. Server module 140 may retrieve intellectual property rights information from database module 120. The retrieved information may include, for example, an intellectual property rights profile, information entered into an intellectual property information data entry template, and/or information uploaded to the database regarding a media presentation. This retrieval may occur upon reception of a notice sent by database 120 to server 140 indicating that database 120 has information to send to server 140. The information to be sent may be new or revised information associated with a media presentation. Server module 140 may look for such notifications on, for example, a periodic basis (e.g. every five seconds) or on an as needed basis.

Server module 140 may also manipulate intellectual property rights information associated with a media presentation into a format readable by intellectual property rights management module 130. In addition, server module 140 may receive a generated intellectual property rights profile of a media presentation from, for example, intellectual property rights management module 130. Server module 140 may also send a generated intellectual property rights profile of a media presentation to another module of the system, for example GUI module 110.

Presentation module 150 may be communicatively coupled to, for example, GUI module 110, and may display one or more pages prepared by GUI module 110 to a user, such as 160. Presentation module may be, for example, a computer system configured with a web browser.

In some embodiments, server module 140 includes a first and second module 170 and 180, respectively. First module 170 may retrieve intellectual property rights information from database module 120. This retrieval may occur upon reception of a notice sent by database 120 to first module 170 indicating that database 120 has information to send to server 140. The information to be sent may be new or revised information associated with a media presentation. First module 170 may look for such notifications on, for example, a periodic basis (e.g. every five seconds) or on an as needed basis.

First module 170 may send received intellectual property rights information to second module 180 along, for example, communication link 190. Second module 180 may also manipulate intellectual property rights information associated with a media presentation into a format readable by intellectual property rights management module 130. Second module 180 may then send the manipulated intellectual property rights information to intellectual property rights management module 130 along, for example, communication link 190.

Intellectual property rights management module 130 may then generate an intellectual property rights profile for the media presentation and send it to first module 170 along, for example, communication link 190. First module 170 may then send the intellectual property rights profile to, for example, GUI module 110 along, for example communication link 190. Communication link(s) may be any link to facilitate communication by system 100 and/or modules within system 100, including wired and/or wireless connections.

Figure 2:
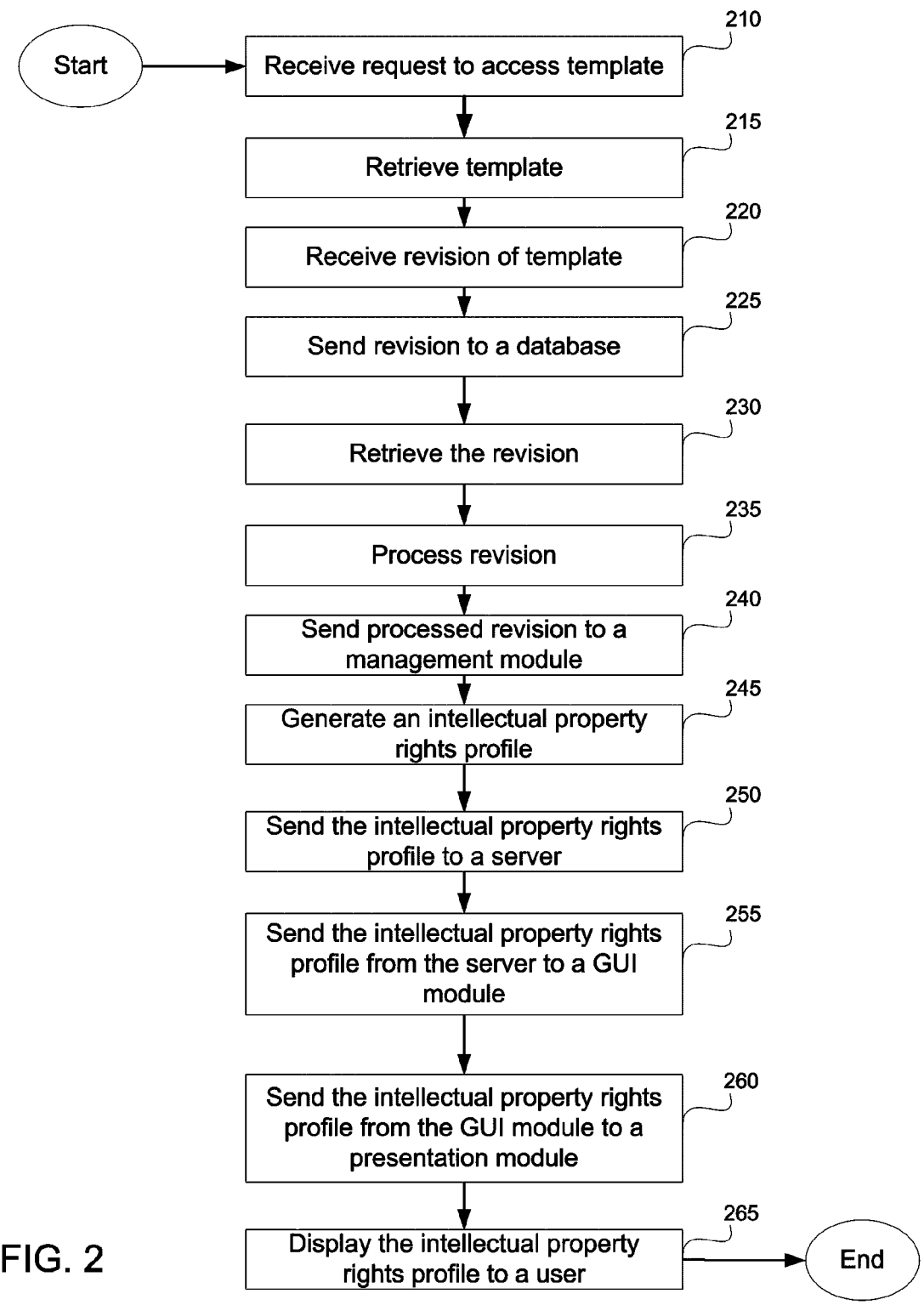
FIG. 2 shows an exemplary process for generating and/or displaying an intellectual property rights profile for a media presentation, consistent with some embodiments of the present application.
Figure 4A:
Figure 4B:
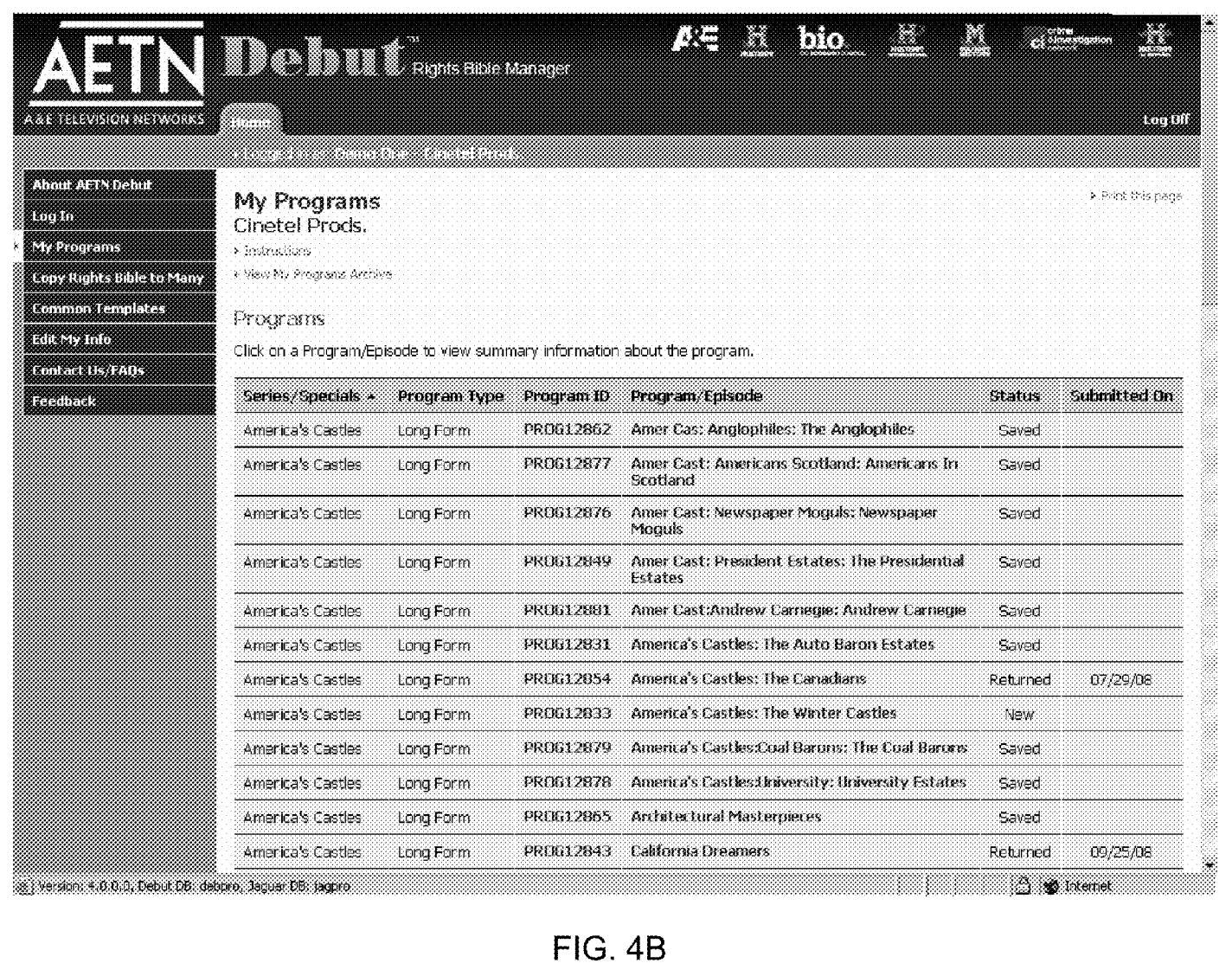

FIG. 2 shows an exemplary process 200 for generating and/or displaying an intellectual property rights profile for a media presentation. Process 200 may be performed on a system for generating and/or displaying an intellectual property rights profile for a media presentation, such as system 100. In step 210, a request to access a data entry template associated with the media presentation may be received. The request may be received by a GUI module, such as GUI module 110. The request may be received from, for example, a user, such as user 160, a party who may display the media presentation to an audience (e.g. an administrator of process 200), and/or a third party, interacting with a presentation module, such as presentation module 150. The requester may be required to validate their identity and/or pass through other security measures to access the data entry template and/or process 200. The data entry template for which access is requested may be linked to a media presentation displayed on a page generated by a GUI module, such as GUI module 110, and may be displayed by a presentation module, such as presentation module 150. Examples of such pages are shown in FIGS. 4A and 4B.

In step 215, the requested data entry template may be retrieved from, for example, a database module, such as database module 120. The requested data entry template may be retrieved by a GUI module, such as GUI module 110. The data entry template may then be displayed, for example, as a page generated by the GUI module, by a presentation module, such as presentation module 150, to a user, such as user 160. Exemplary data entry template pages are shown in FIGS. 2B and 2C.

Revisions of the data entry template may then be received (step 220). Revisions may include, for example, data entered into the data entry template and/or revisions to the data entry template. The revisions may be received from, for example, a user, such as user 160, an administrator, and/or may be automatically entered by another module, such as intellectual property rights management module 130, to be, for example, consistent with other, related data entry templates or media presentations. The revisions may be received by, for example, a GUI module, such as GUI module 110. Revisions to the data entry template may include, for example, information identifying the media presentation, information regarding an intellectual property right related to the media presentation, and/or documents related to media presentation. More specifically, exemplary revisions may include information regarding a license(s) for the media presentation (e.g. contact information for the licensor, license type, and/or duration of the license), or a classification for the media presentation. Possible classifications for a media presentation may be displayed to a user as a list so that one or more classifications may be selected. Such classifications may include, for example, the type of media presentation (e.g. documentary or comedy), whether the media presentation is part of a series, the length of the media presentation, or whether a media profile contains sensitive information or footage (e.g. sexually explicit content or graphic violence). The classification of a media presentation may be linked to standards and practices guidelines for an enterprise displaying the media presentation to an audience. Exemplary standard and practice guidelines may include not showing advertisements for children's toys during media presentations including sexually explicit content or graphic violence, or limiting the scheduled time for displaying such a media presentation to an audience to after 9:00 pm.

Revisions to the data entry template may also include, for example, uploading a document to the intellectual property rights profile of the media presentation to the template. Exemplary uploaded documents include images or PDFs of signed release forms, scripts, publicity materials (e.g. photos), or music cue sheets. In some cases, the document may be uploaded from an external application to the intellectual property rights profile of the media presentation. Exemplary external applications may include RapidCue™ in the example of a music cue sheet.

The data entry template may also provide additional templates for other information related to the intellectual property rights profile of a media presentation. Such additional templates may include, for example, templates for securing or verifying intellectual property rights (e.g. location or music license or release) from a third party.

In one embodiment, process 200 may include providing access to or receiving data regarding the production quality of master data for the media presentation (e.g. a rough cut or final cut). In some cases, a third party may be evaluating the production quality and may enter data into the intellectual property rights profile for the media presentation regarding what, if any, changes need to be made to the media presentation to increase the production quality of the master data for the media presentation.

In one embodiment, process 200 may further include accessing a library of media presentations that may be related to the media presentation. The library may include, for example, footage of historical events, a music soundtrack, or still photographs. The library may be provided by, for example, a user of process 200, or an administrator of process 200. The library may be stored on, for example, a database like database 120.

In step 225, the revisions may be sent to a database module, such as database module 120. The database module may then store the revisions. The database module may also notify another module, for example, server module 140 or first module 170, that it has received revised data. Upon receiving this notification, server module 140 or first module 170 may retrieve the revised data (step 230).

In step 235, the revised data may be processed to be compatible with an intellectual property rights management module, such as intellectual property rights management module 130. The processing may be performed by a server, such as server 140 or by a module in the server, such as second module 180. The processed revised data may then be sent to an intellectual property rights management module, such as intellectual property rights management module 130 (step 240). Then, the processed, revised data may be used by, for example, the intellectual property rights management module, to generate the intellectual property rights profile of the media presentation (step 245). In step 250, the generated intellectual property rights profile of the media presentation may be sent by, for example, the intellectual property rights management module, to a server, for example, server 140 which then sends the intellectual property rights profile of the media presentation to a GUI module, such as GUI module 110 (step 255). The GUI module may then send the intellectual property rights profile to a presentation module, such as presentation module 150 (step 260) which may then display the intellectual property rights profile of the media presentation to a user, such as user 160 (step 265) and process 200 may end.

Figure 3:
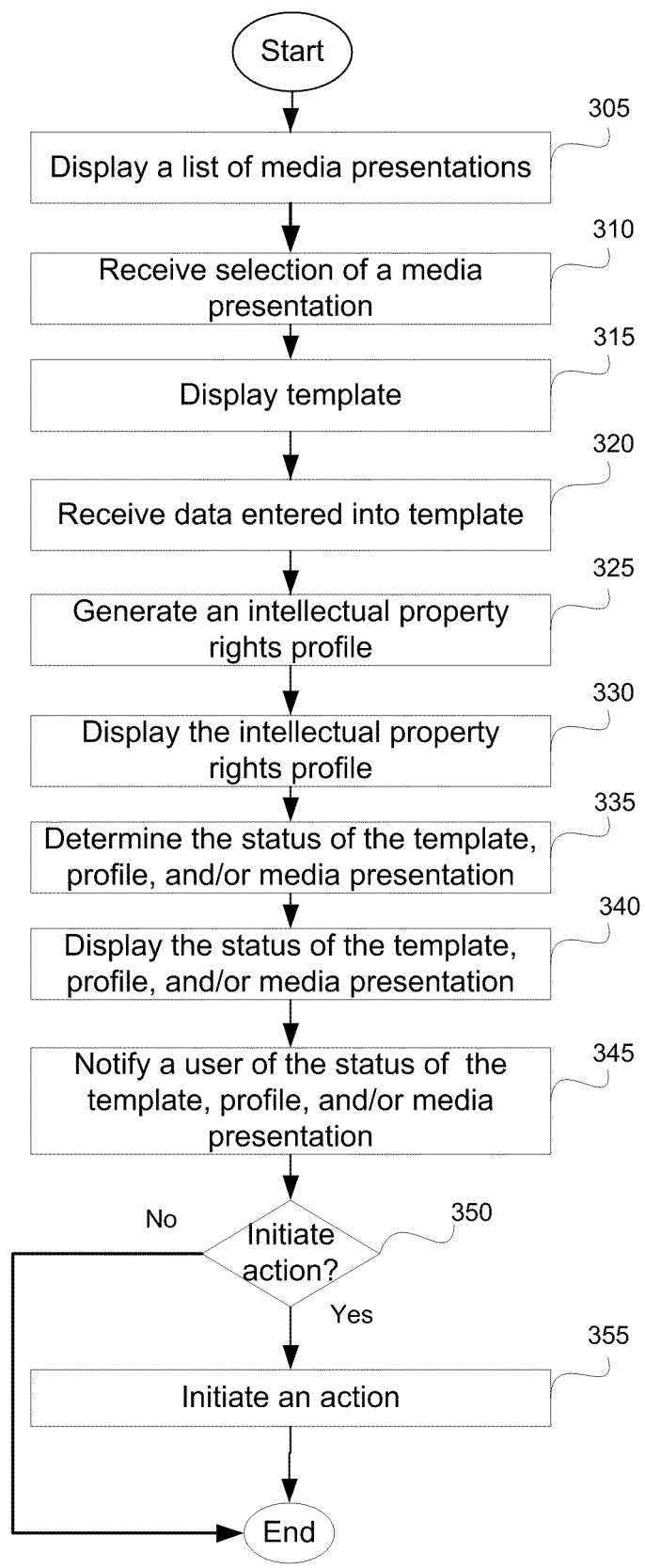
FIG. 3 shows an exemplary process for generating and/or displaying an intellectual property rights profile for a media presentation, consistent with some embodiments of the present application.
Figure 4C:
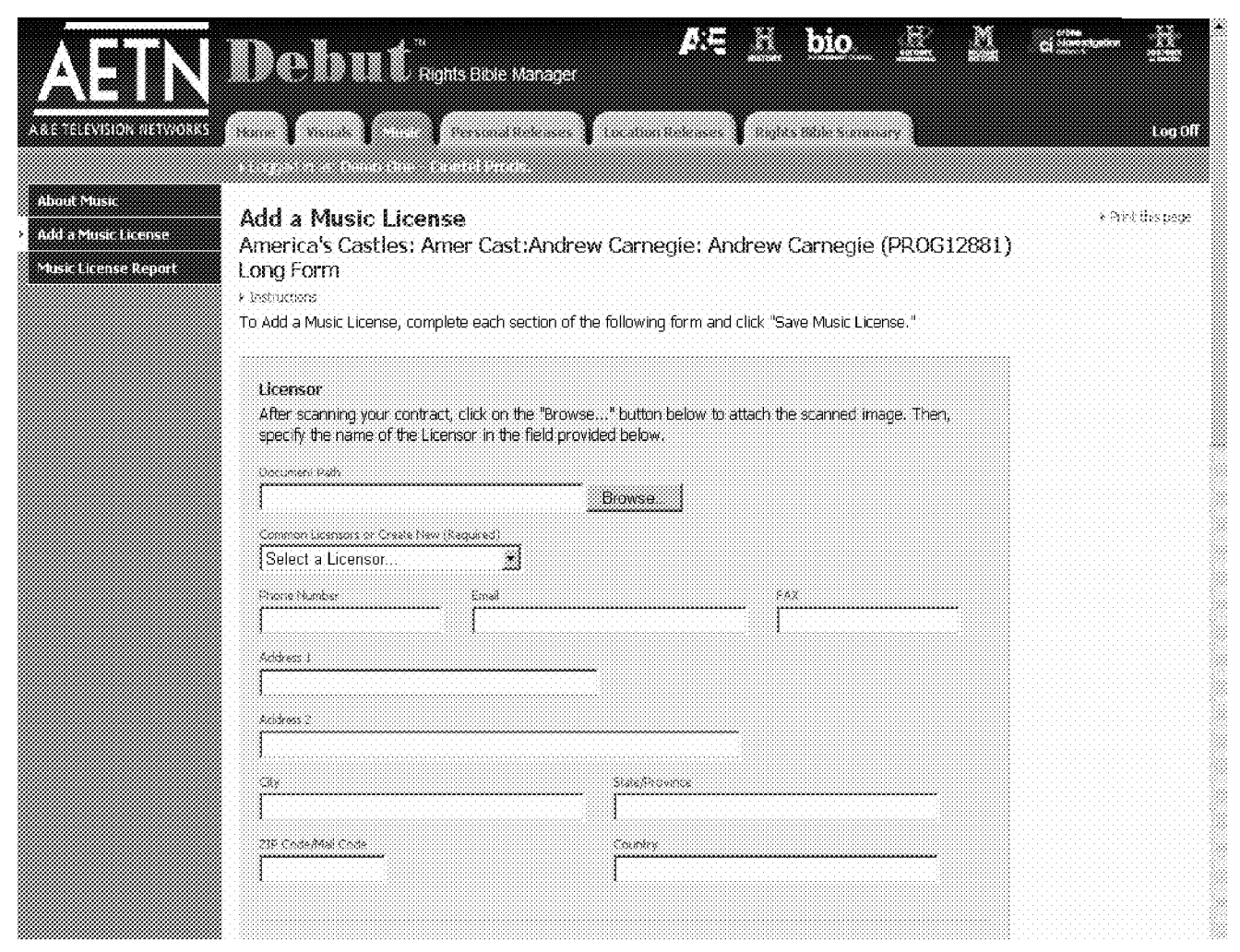
Figure 4D:
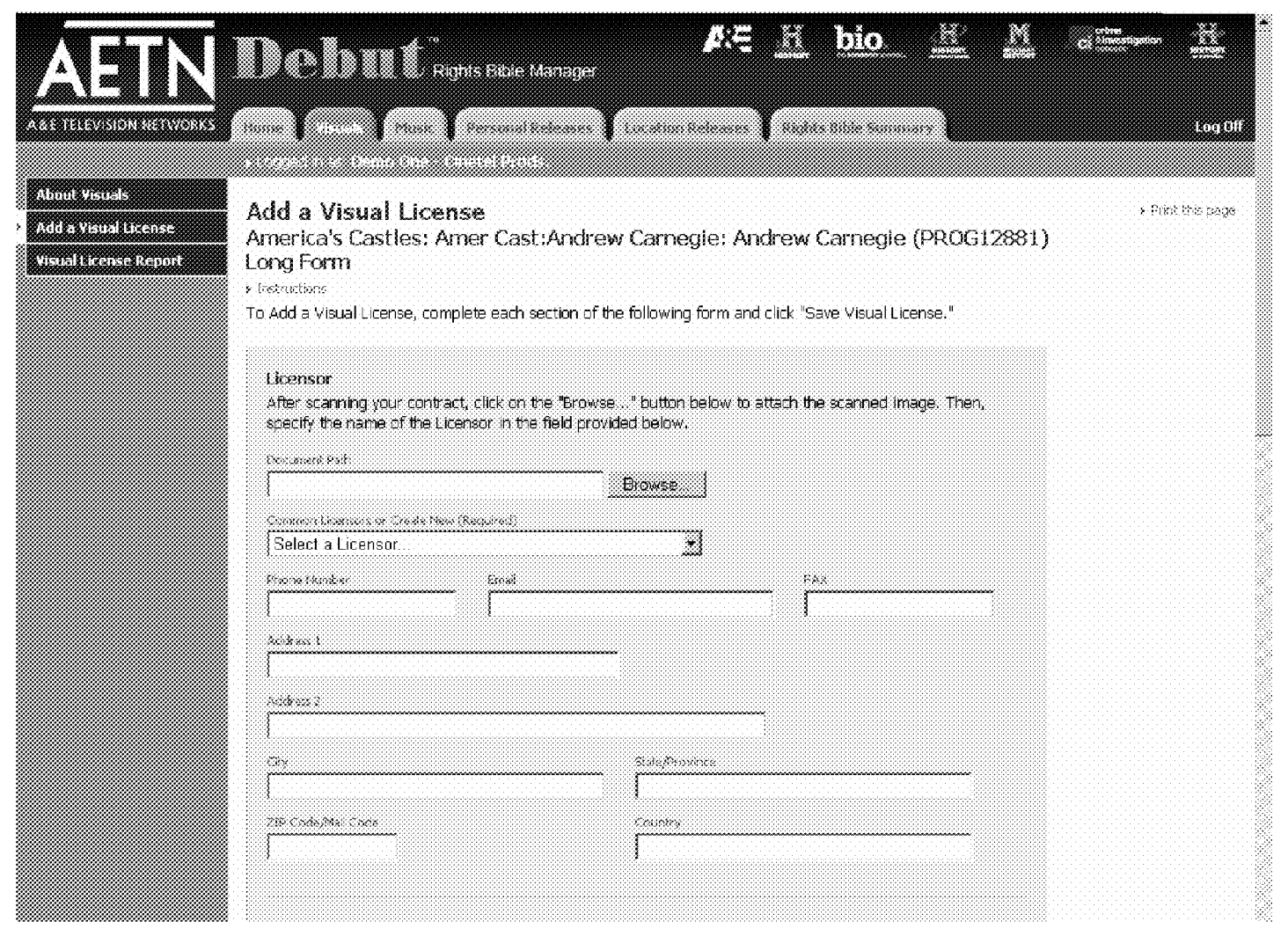
Figure 4E:
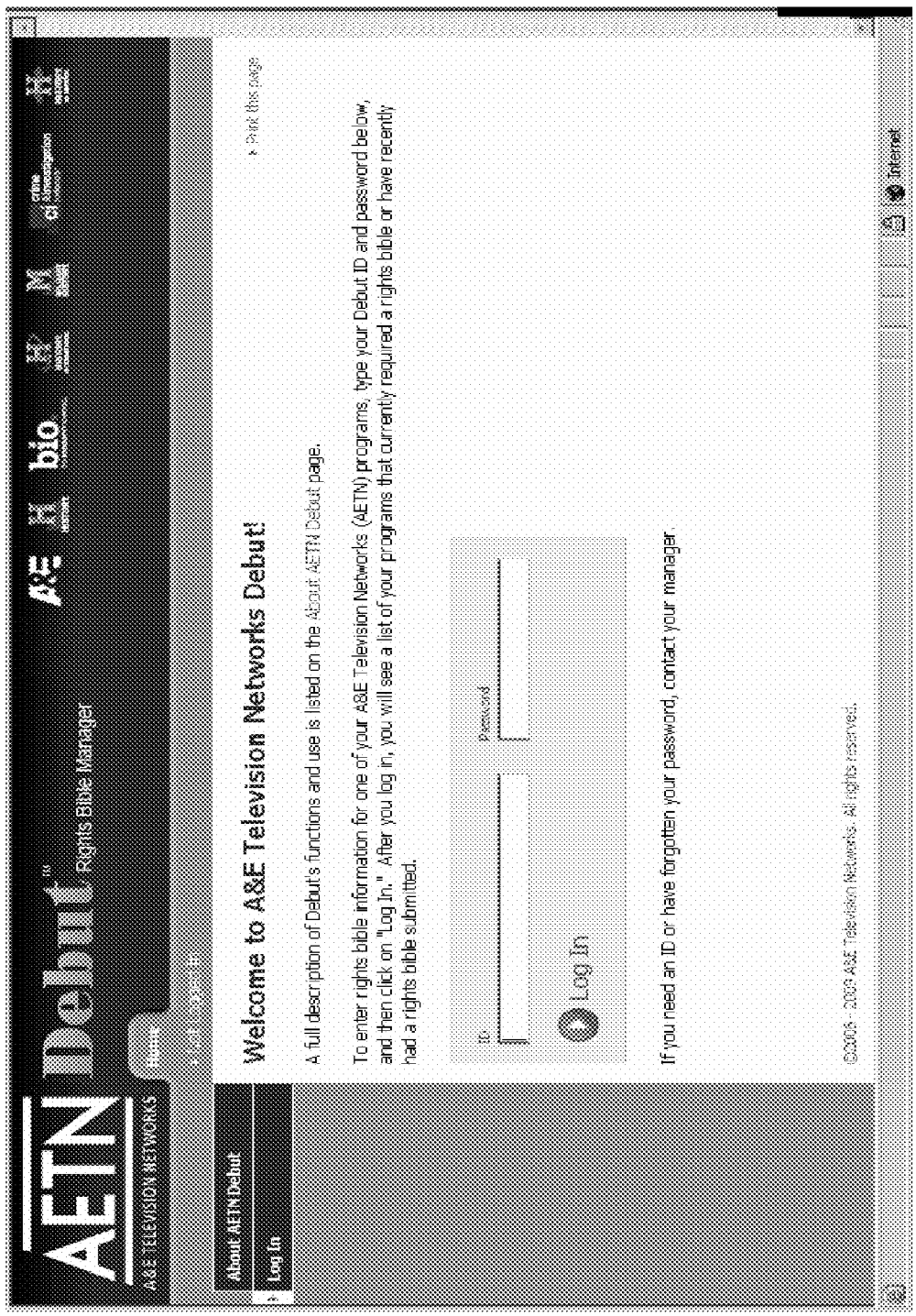
FIGS. 4E-4F show an exemplary screen shot of a login page for limited access to a program for generating and/or displaying an intellectual property rights profile for a media presentation to authorized users, consistent with some of the embodiments of the present application.
Figure 4F:
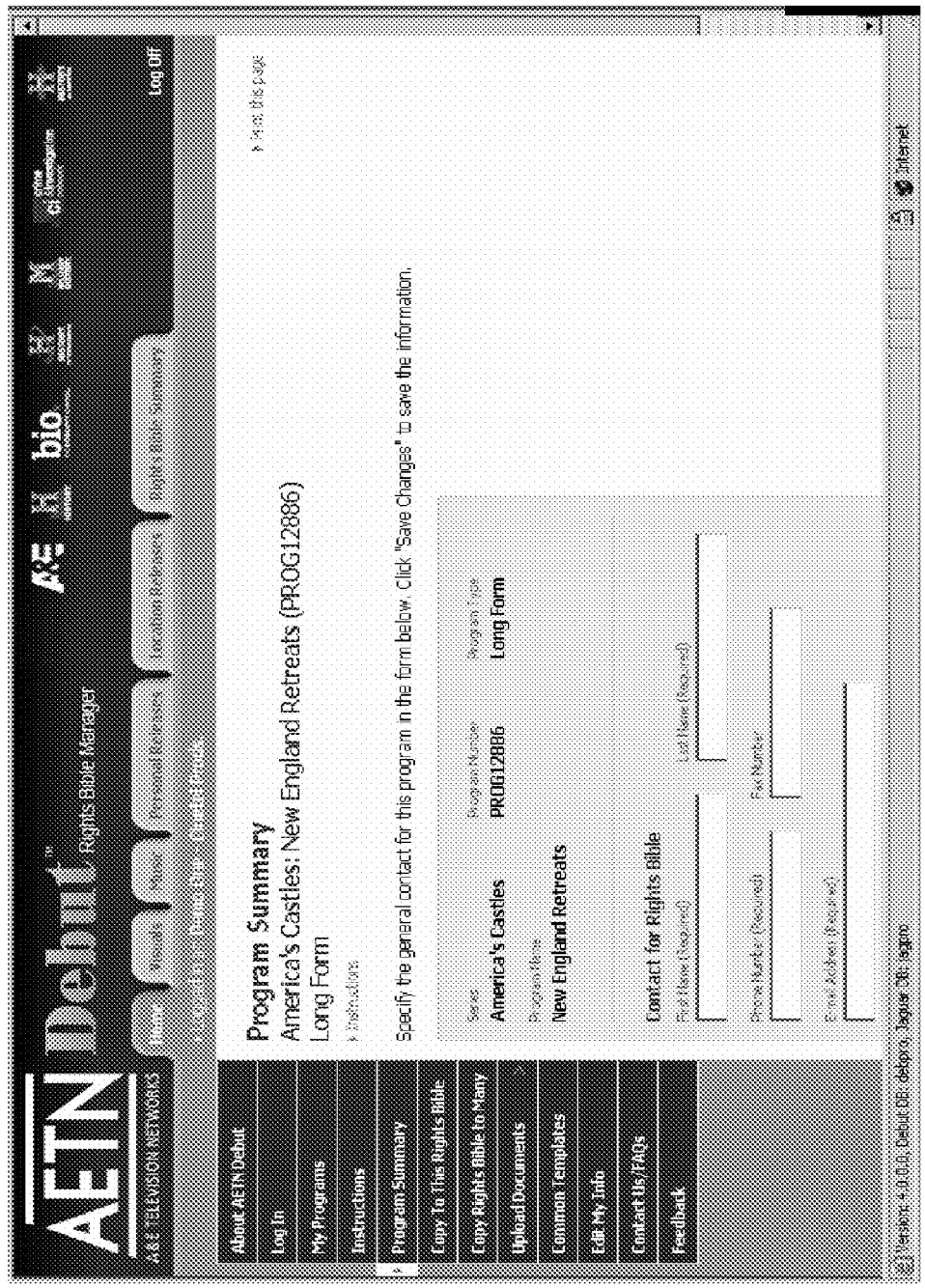
Figure 4H:
Figure 41:
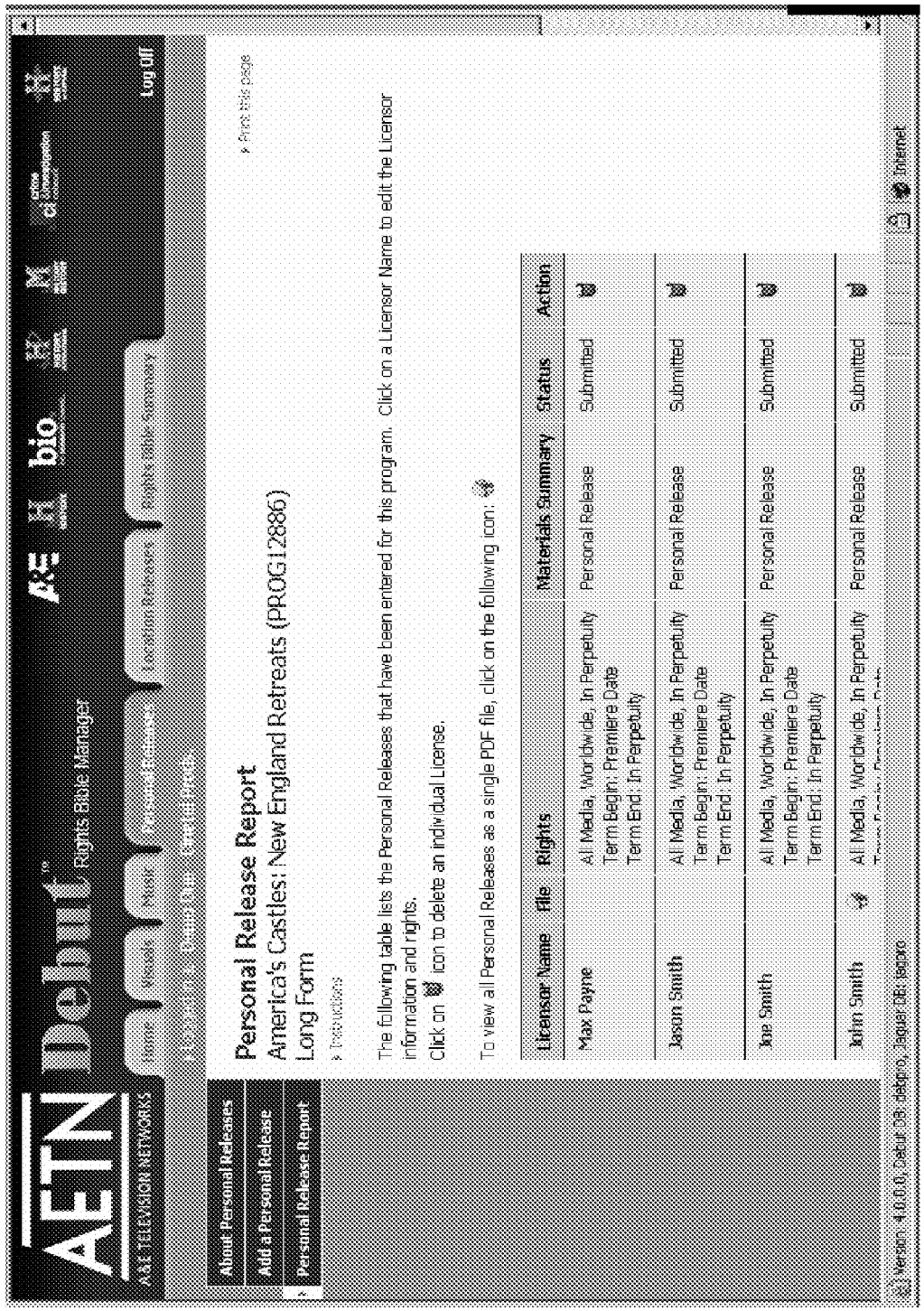

FIG. 3 shows an exemplary process 300 for generating and/or displaying an intellectual property rights profile for a media presentation. Process 200 may be performed on a system for generating and/or displaying an intellectual property rights profile for a media presentation, such as system 100. In step 305, a list of media presentations may be displayed to, for example, a user, such as user 160 or an administrator of process 300. The displayed list may be generated by a GUI module, such as GUI module 110, and may be displayed by a presentation module, such as presentation module 150. Exemplary GUI pages illustrating an exemplary list of media presentation are shown in FIGS. 4A and 4B. A user may be required to undergo a log in or security clearance process to view the display. Exemplary GUI pages illustrating such a process are shown in FIGS. 4E and 4F. The list of media presentations shown may be specific to the user. For example, a television producer may only see a list of media presentations related to the television episodes he produces. The media presentations provided on the list may be related, for example, they may be episodes in the same television series or songs from the same album.

In step 310, a user selects a media presentation from the list of media presentations. The list may be interactive so that when the user selects, or clicks on, an item from the list a second page is displayed. The second page may be an intellectual property right data entry template associated with the selected media presentation (step 315). The intellectual property right data entry template may be set up to receive data regarding the selected media presentation. For example, an intellectual property right data entry template may be displayed for entering data regarding a visual or music license related to the media presentation, as is shown in exemplary FIGS. 4C and 4D, respectively. The display template may be generated by a GUI module, such as GUI module 110, and may be displayed by a presentation module, such as presentation module 150.

In step 320, the system may receive data entered into the intellectual property right data entry template. The data may be received from a user, such as user 160, an administrator of process 300, and/or a third party. The GUI module of the system, such as GUI module 110 may receive the data. Data entered into the data entry template may include, for example, information identifying the media presentation, information regarding an intellectual property right related to the media presentation, and/or documents related to media presentation. More specifically, exemplary revisions may include information regarding a license(s) for the media presentation (e.g. contact information for the licensor, license type, and/or duration of the license), or a classification for the media presentation. Possible classifications for a media presentation may be displayed to a user as a list so that one or more classifications may be selected. Such classifications may include, for example, the type of media presentation (e.g. documentary or comedy), whether the media presentation is part of a series, the length of the media presentation, or whether a media profile contains sensitive information or footage (e.g. sexually explicit content or graphic violence). The classification of a media presentation may be linked to standards and practices guidelines for an enterprise displaying the media presentation to an audience. Exemplary standard and practice guidelines may include not showing advertisements for children's toys during media presentations including sexually explicit content or graphic violence, or limiting the scheduled time for displaying such a media presentation to an audience to after 9:00 pm.

Data entered into the data entry template may also include, for example, uploading a document to the intellectual property rights profile of the media presentation to the template. Exemplary uploaded documents include images or PDFs of signed release forms, scripts, publicity materials (e.g. photos), or music cue sheets. In some cases, the document may be uploaded from an external application to the intellectual property rights profile of the media presentation. Exemplary external applications may include RapidCue™ in the example of a music cue sheet.

The data entry template may also provide additional templates for other information related to the intellectual property rights profile of a media presentation. Such additional templates may include, for example, templates for securing or verifying intellectual property rights (e.g. location or music license or release) from a third party.

In step 325, an intellectual property rights profile may be generated for the media presentation. The intellectual property rights profile may be generated using the received data. In step 330, the intellectual property rights profile is displayed to the user. The intellectual property rights profile display page may be generated by a GUI module, such as GUI module 110, and may be displayed by a presentation module, such as presentation module 150.

In step 335, the status of the intellectual property rights profile, an intellectual property right data entry template, or portion of the intellectual property rights profile may be analyzed to determine its status. Exemplary statuses may include "complete," "incomplete," or "new." In step 340, the status of the intellectual property rights profile, an intellectual property right data entry template, or portion of the intellectual property rights profile may be displayed to, for example the user, or another, second user with access to the intellectual property rights profile, such as an administrator. Exemplary second users may include, in the example of television media presentations, television network managers or the accounting department of the television network. Exemplary formats for displaying the status of an intellectual property rights profile, an intellectual property right data entry template, or portion of the intellectual property rights profile are shown in the exemplary reports and summaries shown in FIGS. 4G-4J.

In step 345, a user and/or second user is notified of the status of the intellectual property rights profile, intellectual property right data entry template, or portion of the intellectual property rights profile of a media presentation. Exemplary notifications include an email, fax, or displayed message. In step 350, it is determined whether an action is to be initiated based on the status of the intellectual property rights profile, intellectual property right data entry template, or portion of the intellectual property rights profile. Exemplary actions include further notifications, the release of monetary funds, or requests for more information. If it is determined that an action is not to be initiated, then process 300 may end. If it is determined that an action is to be initiated, then, in step 355, such action is initiated and process 300 may end.

In some embodiments, process 300 may include displaying at least one option associated with the at least one intellectual property rights data entry template, the intellectual property rights profile, and/or the selected media presentation. The option may be, for example, a list of menu items or tabs displayed on a page of a GUI, such as the pages shown in FIGS. 4A-4K. A selection of an option may be received from, for example, a user such as user 160 and the function associated with the selection option may be executed by, for example, GUI module, such as GUI module 110.

Figure 4J:
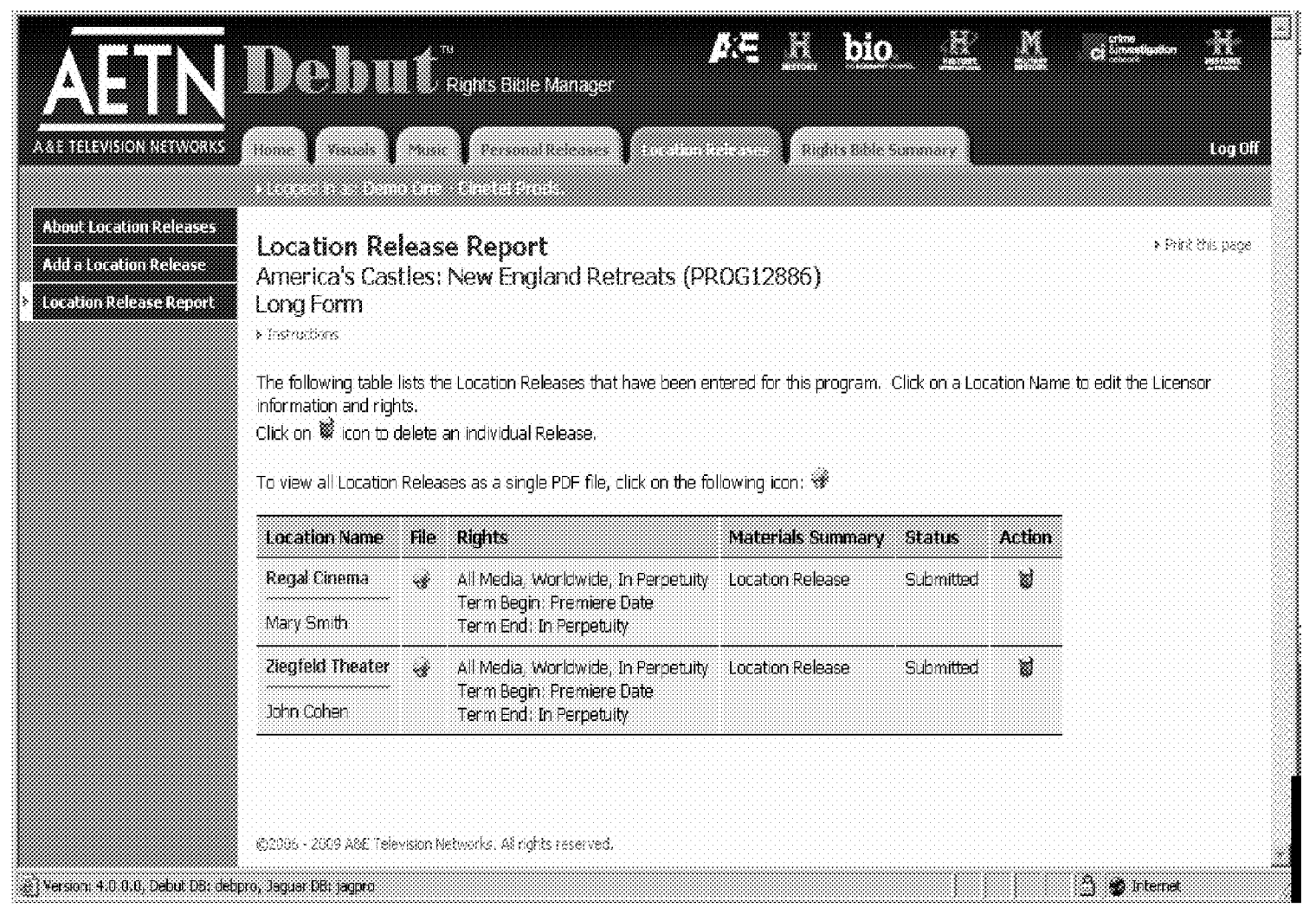
Figure 4K:
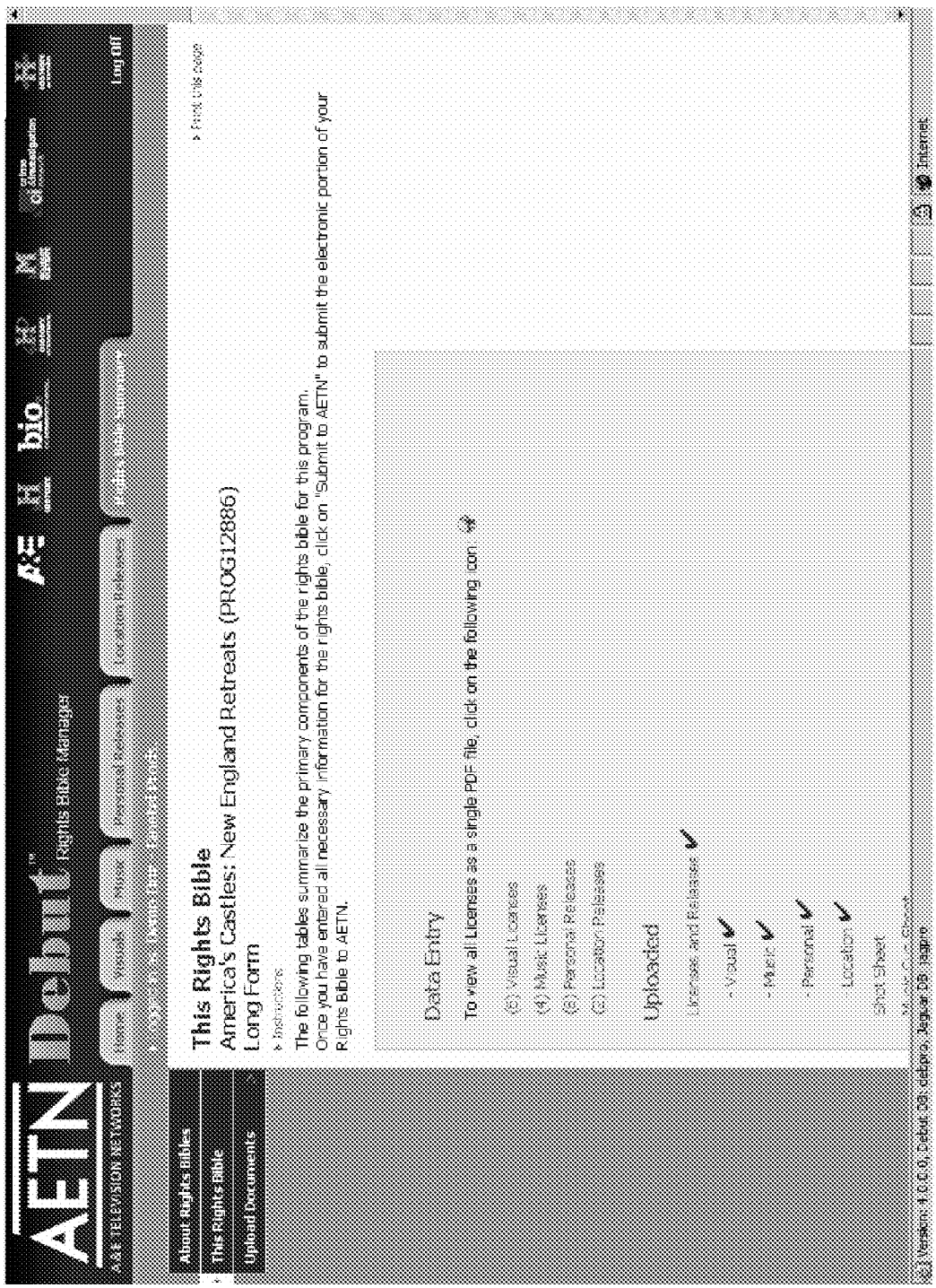
FIG. 4K shows a screen shot of an exemplary summary page of a GUI, consistent with some of the embodiments of the present application.

In one embodiment, process 300 includes displaying the status of an intellectual property rights profile for at least one media presentation on the list of at least one media presentation as in the examples shown in FIG. 4A, 4B, or 4K.

In another embodiment, process 300 includes linking a portion of the intellectual property rights profile of a first media presentation to a portion of a intellectual property rights profile of a second media presentation. In some cases, a first and a second media presentation are part of a series of media presentations like episodes of a television show or songs of an album.

In yet another embodiment, process 300 includes accessing the intellectual property rights profile of a media presentation during a presentation of the media presentation. The accessing may be done in, for example, real time.

In process 300, an intellectual property rights profile may include, for example, one or more of a visual license, a music license, a personal release, a location release, a music cue list, a shot sheet, an errors and omissions certificate, a synopsis, a script, a credits list, and/or a lower thirds license.

Other embodiments of process 300 may include displaying a report page, such as the report pages shown in FIGS. 4G-4J. A displayed report page may include, for example, a portion of the intellectual property rights profile of a media presentation. In some cases, the displayed report page may include an icon for opening a document related to the summarized portion of the intellectual property rights profile of the media presentation. The opened document may be stored in, for example, a database such as database 120.

In one embodiment of process 300, a summary page may be displayed, such as the exemplary summary page shown in FIG. 4K. The summary page may include, for example, a list of portions of an intellectual property rights profile of the media presentation and the status of the listed portions of the intellectual property rights profile of the media presentation. Some or all of the information on the page may be interactive.

Process 300 may also include initiating an action upon the completion of the intellectual property rights profile. Such an action may include notifying a user of the process of the completion of the intellectual property rights profile or submitting a intellectual property rights profile or a portion thereof to a database, such as database 120.

In some embodiments, process 300 may further include uploading a document to the intellectual property rights profile of the media presentation. Exemplary uploaded documents include images or PDFs of signed release forms, scripts, or music cue sheets. In some cases, the document may be uploaded from an external application to the intellectual property rights profile of the media presentation. Exemplary external applications may include RapidCue™ in the example of a music cue sheet.

In one embodiment, process 300 may further include accessing a library of media presentations related to the media presentation. The library may include, for example, footage of historical events, a music soundtrack, or still photographs. The library may be provided by, for example, a user of process 300, or an administrator of process 300. The library may be stored on, for example, database 120.

In yet another embodiment, process 300 includes submitting the intellectual property rights profile of the media presentation to a user. Submitting the intellectual property rights profile may be performed by a user and/or an administrator of process 300. The submission may be performed by selecting an "submit" icon on a displayed GUI page. In some cases, a user of intellectual property rights information submitted for an intellectual property rights profile of the media presentation may be notified.

In some embodiments, process 300 may include opening a document related to the intellectual property rights profile of the media presentation. The document may be opened by selecting an icon displayed on a GUI page.

FIGS. 4A-4K show screen shots of exemplary pages of a GUI for generating and/or displaying an intellectual property rights profile for a media presentation. The exemplary screen shots of FIGS. 4A and 4B show a list of one or more media presentations for which an intellectual property rights profile may be generated. One or more media presentations shown on the list may be interactive so that, when selected it activates another page of a GUI, such as a intellectual property right data entry template, summary, or report.

FIGS. 4C and 4D show exemplary screen shots of intellectual property right data entry templates. Data entered into these templates may be used to, for example, generate an intellectual property rights profile, or a portion thereof. Intellectual property right data entry templates may include one or more interactive menus, buttons, or tabs.

FIGS. 4E and F show an exemplary screen shot of a login page for limited access to a program for generating and/or displaying an intellectual property rights profile for a media presentation to authorized users. Users may be authorized by, for example, a system or program administrator, or a user.

FIGS. 4G-4J show exemplary screen shots of reports for portions of an intellectual property rights profile for a media presentation. Such reports may include intellectual property rights information regarding, for example, a visual, music, personal, or location release.

FIG. 4K shows a screen shot of an exemplary summary page of a GUI. The summary page may include the status for the intellectual property rights profile of a media presentation, or a portion thereof, and may include one or more interactive buttons.

Further exemplary GUIs or pages of a GUI may be displayed to implement one or more processes or functions of the present application. Exemplary GUIs may include an icon for facilitating the uploading of a document to an intellectual property rights profile of the media presentation. Another exemplary GUI may include an icon for linking an intellectual property rights profile of at least two media presentations of an interactive list. A further exemplary GUI may include an icon for accessing a library of media presentations related to a media presentation.

In some embodiments, an exemplary GUI may include a summary page including a list of the intellectual property rights information available for the intellectual property rights profile of the media presentation.

Another exemplary GUI includes an icon for submitting the intellectual property rights profile of the media presentation to a user and/or an icon for notifying a user of intellectual property rights information submitted for an intellectual property rights profile of the media presentation.

In yet another embodiment, a GUI may include an icon for facilitating the uploading of a document from an external software application to the intellectual property rights profile of the media presentation. In some cases, a GUI may include an icon for opening a document related to the intellectual property rights profile of the media presentation.

An exemplary GUI may also include a button which, when selected, notifies, for example, a user, and/or an administrator and the notification may be an advertisement. In some cases, the GUI may include a report page for displaying a portion of the intellectual property rights profile of the media presentation, wherein the report page includes an icon for opening a document related to the summarized portion of the intellectual property rights profile of the media presentation.

In some embodiments, an intellectual property rights profile shown and/or generated using a GUI, includes at least one of a visual license, a music license, a personal release, a location release, a music cue list, a shot sheet, an errors and omissions certificate, a synopsis, a script, a credits list, and/or a lower thirds license.

An exemplary GUI may also include a summary page for displaying a list of portions of an intellectual property rights profile of the media presentation and the status of the listed portions of the intellectual property rights profile of the media presentation.

In some embodiments, an exemplary GUI includes an authorization page for authorizing a user to access the intellectual property rights information of the media presentation. In some cases, an exemplary GUI may include a page displaying the status of at least one of an intellectual property data entry template and an intellectual property rights profile.

Figure 5:
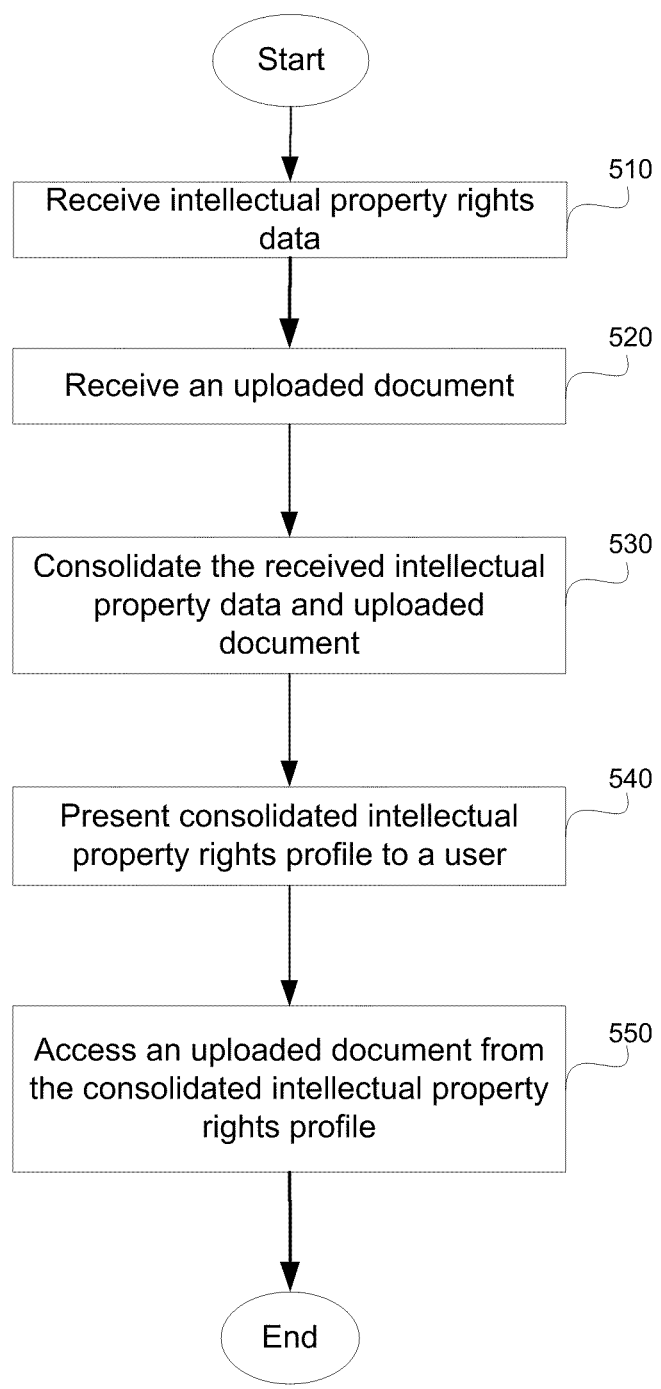
FIG. 5 shows an exemplary process for consolidating intellectual property rights information for a media presentation into an intellectual property rights profile for the media presentation consistent with some of the embodiments of the present application.

FIG. 5 shows an exemplary process 500 for consolidating intellectual property rights information for a media presentation into an intellectual property rights profile for the media presentation. In some embodiments, intellectual property rights information may include, for example, information related to the media presentation and/or an uploaded document related to the intellectual property rights profile of the media presentation. In step 510, intellectual property rights data related to one or more media presentations may be received. The intellectual property rights data may be received from, for example, a user, such as user 160, or may be automatically filled in by a process, such as process 200 and/or 300. Additionally or alternatively, the intellectual property rights data may be received from a producer of the media presentation or an administrator of process 500. The intellectual property rights data may be received by a system, such as system 100.

In step 520, one or more uploaded documents related to the media presentation may be received. The uploaded document(s) may be received from, for example, a user, such as user 160, or may be automatically filled in by a process, such as process 200 and/or 300. Additionally or alternatively, the uploaded documents may be received from a producer of the media presentation or an administrator of process 500. The uploaded document(s) may be received by a system, such as system 100, or a module of system 100, such as server 140. Uploaded documents may include, for example, an image, or data, related to of at least one of a visual license, a music license, a personal release, a location release, a music cue list, a shot sheet, an errors an omissions certificate, a synopsis, a script, a credits list, and a lower thirds license.

In step 530, the received intellectual property rights data and/or uploaded document(s) may be consolidated into a consolidated intellectual property rights profile for the media presentation. The data may be consolidated by, for example, a server, such as server 140, or an intellectual property rights management module, such as intellectual property rights management module 130. The consolidated intellectual property rights profile may then be presented to a user (step 540) by, for example, a GUI module and/or a presentation module, such as GUI module 110 and/or presentation module 150. The consolidated intellectual property rights profile may be stored in, for example, a database, such as database module 120. The consolidated intellectual property rights profile may then be accessed by a user, such as user 160.

Figure 6:
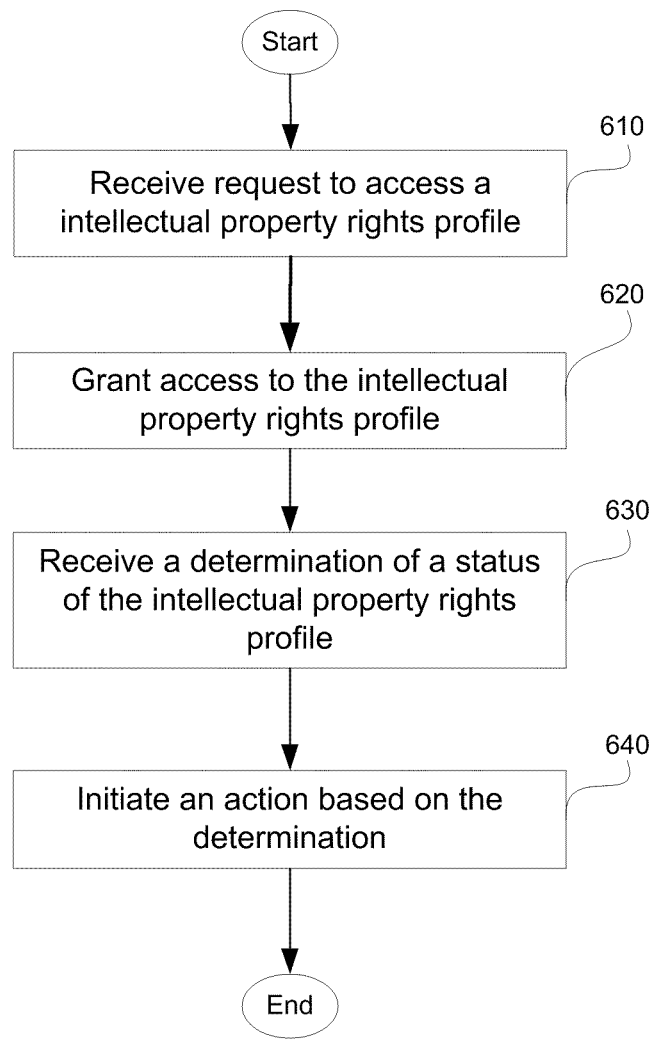
FIG. 6 shows an exemplary process for initiating an action based on the determined status of an intellectual property rights profile of a media presentation consistent with some of the embodiments of the present application.

FIG. 6 shows an exemplary process 600 for initiating an action based on the determined status of an intellectual property rights profile of a media presentation. In step 610, a request to access the intellectual property rights profile may be received from a user, such as user 160, or an administrator of process 600. The request may be received by, for example, a presentation module and/or a GUI module, such as GUI module 110 and/or presentation module 150. In step 620, access to the intellectual property rights profile may be granted to, for example, the user and/or administrator. Access may be granted after establishing a secure connection between the user and/or administrator and the presentation and/or GUI module. Additionally, or alternatively, a user and/or administrator may be required to verify their identity through a log in procedure. Exemplary login pages are shown in FIGS. 4E-4F. Access may be granted by, for example, a server, such as server 140.

In step 630, a determination of a status for the intellectual property rights profile may be received from, for example, a user, such as user 140 and/or an administrator of process 600. The determination may include, for example, determining whether the intellectual property rights profile is complete and/or accurate. In some cases, the user may be an administrator of intellectual property rights profiles for an enterprise that displays media presentations to an audience. The determination may be automatically performed by, for example, server 140 and/or intellectual property rights management module 130. Additionally or alternatively the determination may be performed by a person reviewing the intellectual property rights profile.

In step 640, an action may be initiated based on the received determination. The initiated action may include, for example, a release of funds to a second user and/or notifying the second user of the determined status of the intellectual property rights profile. In the example of television media presentations, when the status for an intellectual property rights profile of a television media presentation is determined to be complete and accurate, a payment may be released to its producers.

All processes herein described may require secure connection between a user and the presentation module and/or GUI module. Furthermore, a user may be required to verify its identity and/or login prior to interacting with any of the processes herein described.

The invention claimed is:

1. A system for generating, displaying and updating an intellectual property rights profile associated with a media presentation, the system comprising:
   a hardware processor and a memory operably coupled thereto, wherein the memory storing a set of instructions to execute via the hardware processor and thereby enable:
      a graphical user interface (GUI) module, wherein the GUI module enables a user to interact with and enter intellectual property rights information associated with a creation of the media presentation and displays a generated intellectual property rights profile associated with the media presentation based on such entering;
      a database module, readable by the graphical user interface module, wherein the database module stores intellectual property rights information associated with the media presentation;
      an intellectual property rights management module coupled to the GUI module and the database module, wherein the intellectual property rights management module processes the intellectual property rights information associated with the presentation for storage in the database module, wherein the processing comprising analyzing the intellectual property rights information for the media presentation and generating the intellectual property rights profile for the media presentation;
      a server module, communicatively coupled to the database module, the intellectual property rights management module, and the GUI module, wherein the server module retrieves the intellectual property rights information associated with the media presentation from the database module, processes the intellectual property rights information associated with the media presentation and transmits the intellectual property rights information associated with the media presentation to a presentation module for display as the intellectual property rights profile; and
      the presentation module, communicatively coupled to the GUI module and the server module, wherein the presentation module displays the intellectual property rights profile associated with the media presentation as generated by the GUI module, and
   wherein the intellectual property rights information associated with the media presentation comprises at least one of the following: a personal release, a location release, a music cue list, a shot sheet, an errors and omissions certificate, a synopsis, a script, a credits list, and a lower thirds license,
   wherein the intellectual property rights profile is associated with information regarding a production quality of master data for the media presentation,
   wherein the server module receives the information regarding the production quality of master data for the media presentation from a third party,
   wherein the master data for the media presentation is accessible by the third party,
   wherein the information regarding the production quality of the master data for the media presentation received from the third party relates to a change to increase the production quality of the master data for the media presentation.

2. The system of claim 1, wherein the server module comprises:
   a first module, communicatively coupled to the database module, wherein the first module retrieving intellectual property rights information associated with the media presentation from the database module, receiving the generated intellectual property rights profile from the intellectual property rights management module, and sending the generated intellectual property rights profile to the GUI module; and
   a second module, wherein the second module manipulates the received intellectual property rights information into a format readable by the intellectual property rights management module and sends the manipulated intellectual property rights information to the intellectual property rights management module to generate the intellectual property rights profile.

3. The system of claim 1 wherein the intellectual property rights information associated with the media presentation further comprises at least one of a visual license, and a music license.

4. The system of claim 1, wherein:
   at least one of the GUI module and the presentation module controlling a user access to the intellectual property rights profile and granting the user access to the intellectual property rights profile, and
   at least one of the intellectual property rights management module and the server module receiving a status determination of the intellectual property rights profile based on the granting the user access to the intellectual property rights profile, the status determination is based on whether the intellectual property rights profile is at least one of complete and accurate, and at least one of the intellectual property rights management module and the server module initiating an action based on the status determination of the intellectual property rights profile, the action comprising at least one of a release of funds to a producer of the media presentation and a request for more profile information.

5. The system of claim 1, wherein at least one of the GUI module and the presentation module displaying a list of at least one media presentation, wherein each of the at least one media presentation is referred via a reference, wherein the reference referring to the intellectual property rights profile of the media presentation generated via the intellectual property rights management module.

6. The system of claim 1, wherein the intellectual property rights management module linking a portion of the intellectual property rights profile of the media presentation to a portion of an intellectual property rights profile of a second media presentation, wherein the intellectual property rights management module generating the intellectual property rights profile of the second media presentation.

7. The system of claim 1, wherein the analyzing comprising:
determining whether at least one of each personal release, each location release, the music cue list, the shot sheet, the errors and omissions certificate, the synopsis, the script, the credits list, and the lower thirds license has been at least one of obtained and completed.

8. A method, implemented on a system that includes a processor, a database, and a communications network, for generating and displaying an intellectual property rights profile associated with a media presentation, the method comprising:
receiving, at the processor, a request to access a template;
transmitting, to a graphical user interface (GUI) module coupled to the processor, a data entry template associated with the media presentation;
displaying via a GUI, the retrieved data entry template;
inputting data wherein the data includes at least one of the following: a personal release, a location release, a music cue list, a shot sheet, an errors and omissions certificate, a synopsis, a script, a credits list, and a lower thirds license; updating the data entry template with the input data;
sending, via the communications network the input data to the database coupled to a database module, wherein the database module is coupled to a server module;
storing the input data in the database;
storing an address in the database associated with a location of an electronic version of at least one underlying document identified by the data;
processing, the input data to be compatible with an intellectual property rights management module;
sending, via the processor, the processed data to the intellectual property right management module;
generating, via the intellectual property rights management module, based on the processed data, an intellectual property rights profile associated with the media presentation, wherein the intellectual property rights management module processes the intellectual property rights information associated with a creation of the media presentation for storage in the database, and wherein the processing comprising analyzing the intellectual property rights information for the media presentation and generating the intellectual property rights profile for the media presentation;
transmitting, the intellectual property rights profile to the GUI module;
sending via the GUI module, the intellectual property rights profile to a presentation module, and
displaying, on the GUI, the intellectual property rights profile to a user based on the generating,
wherein the intellectual property rights profile is associated with information regarding a production quality of master data for the media presentation,
wherein the server module receives the information regarding the production quality of master data for the media presentation from a third party,
wherein the master data for the media presentation is accessible by the third party,
wherein the information regarding the production quality of the master data for the media presentation received from the third party relates to a change to increase the production quality of the master data for the media presentation.

9. The method of claim 8, wherein the intellectual property rights profile is consolidated when presented to the user, wherein the consolidated intellectual property rights profile is configured to enable the user to access a document therefrom.

10. A method for generating an intellectual property rights profile associated with a media presentation, the method comprising:
displaying, via a hardware processor, a list of at least one media presentation via a GUI module, wherein the list is specific to a user;
receiving, via the hardware processor, a selection of a media presentation;
displaying, via the hardware processor, an intellectual property rights data entry template associated with the selected media presentation;
receiving, via the hardware processor, data entered into the intellectual property rights data entry template by the user;
generating, via the hardware processor, the intellectual property rights profile of the media presentation using the received data via an intellectual property rights management module, wherein the intellectual property rights management module processes the intellectual property rights data associated with the presentation for storage in a database coupled to a database module readable by the GUI module, wherein the processing comprising analyzing the intellectual property rights information for the media presentation and generating the intellectual property rights profile for the media presentation, wherein the intellectual property rights information is associated with a creation of the media presentation; and
displaying the intellectual property rights profile of the media presentation to the user via a presentation module based on the generating, wherein the received data comprises at least one of the following: a personal release, a location release, a music cue list, a shot sheet, an errors and omissions certificate, a synopsis, a script, a credits list, and a lower thirds license, wherein the presentation module is coupled to the GUI module and a server module, wherein the server module is coupled to the database module,
wherein the intellectual property rights profile is associated with information regarding a production quality of master data for the media presentation, wherein the server module receives the information regarding the production quality of master data for the media presentation from a third party,
wherein the master data for the media presentation is accessible by the third party,
wherein the information regarding the production quality of the master data for the media presentation received from the third party relates to a change to increase the production quality of the master data for the media presentation.

11. The method of claim 10, further comprising displaying a notice associated with one of the media presentation, the intellectual property rights data entry template, and the intellectual property rights profile.

12. The method of claim 10, further comprising determining the status of at least one of the intellectual property rights data entry template, the intellectual property rights profile, and the selected media presentation.

13. The method of claim 12, further comprising displaying the status of at least one of the intellectual property rights data entry template, the intellectual property rights profile, and the media presentation to a user.

14. The method of claim 12, further comprising notifying a user of the status of at least one of the intellectual property rights data entry template, the intellectual property rights profile, and the selected media presentation.

15. The method of claim 12, further comprising:
determining whether to initiate an action based on the status of at least one of the intellectual property rights data entry template, the intellectual property rights profile, and the selected media presentation; and
initiating an action based on the determination.

16. The method of claim 10, further comprising:
displaying at least one option associated with the at least one of the intellectual property rights data entry template, the intellectual property rights profile, and the selected media presentation;
receiving a selection of an option; and
executing a function associated with the selected option.

17. The method of claim 10, further comprising linking a portion of the intellectual property rights profile of a first media presentation to a portion of a intellectual property rights profile of a second media presentation.

18. The method of claim 10, wherein a first and a second media presentation are part of a series of media presentations.

19. The method of claim 10, further comprising displaying a report page including a portion of the intellectual property rights profile of the media presentation, wherein the report page includes an icon for opening an electronic version of an underlying document of the intellectual property rights profile of the media presentation.

20. The method of claim 10, further comprising displaying a summary page including a list of portions of an intellectual property rights profile of the media presentation and the status of the listed portions of the intellectual property rights profile of the media presentation.

21. The method of claim 10, further comprising initiating an action upon the completion of the intellectual property rights profile.

22. The method of claim 10, further comprising uploading a document to the intellectual property rights profile of the media presentation.

23. The method of claim 10, further comprising uploading a document from an external software application to the intellectual property rights profile of the media presentation.

24. The method of claim 10, further comprising accessing a library of media presentations related to the media presentation.

25. The method of claim 10, further comprising submitting the intellectual property rights profile of the media presentation to a user.

26. The method of claim 10, further comprising notifying a user of intellectual property rights information submitted for an intellectual property rights profile of the media presentation.

27. The method of claim 10, wherein the analyzing comprising:
determining whether at least one of each personal release, each location release, the music cue list, the shot sheet, the errors and omissions certificate, the synopsis, the script, the credits list, and the lower thirds license has been at least one of obtained and completed.

28. A computer program product used with a processor, the computer program product comprising:
a non-transitory computer usable medium having computer readable program code embodied therein that is used for generating and displaying an intellectual property rights profile associated with a media presentation, the computer readable program code including:
computer readable program code used to receive, via a graphical user interface (GUI) module, a request to access a data entry template associated with the media presentation;
computer readable program code used to retrieve, via the GUI module, the data entry template from a database coupled to a database module readable by the GUI module;
computer readable program code used to receive, via the GUI module, data for the data entry template;
computer readable program code used to send, via the GUI module, the data to the database;
computer readable program code used to retrieve, via a server, the data from the database, wherein the server is coupled to a server module;
computer readable program code used to process, via the server, the data to be compatible with an intellectual property rights management module;
computer readable program code used to send, via the server, the processed data to the intellectual property right management module;
computer readable program code used to process the data, via the intellectual property rights management module to generate the intellectual property rights profile, wherein the intellectual property rights management module processes the intellectual property rights information associated with a creation of the media presentation for storage in the database, wherein the processing comprising analyzing the intellectual property rights information for the media presentation and generating the intellectual property rights profile for the media presentation;
computer readable program code used to send, via the intellectual property rights management module, the intellectual property rights profile to the server;
computer readable program code used to send, via the server, the intellectual property rights profile to the GUI module;
computer readable program code used to send via the GUI module, the intellectual property rights profile to a presentation module, and
computer readable program code used to display, via the presentation module, the intellectual property rights profile to a user, wherein the intellectual property rights profile includes at least one of the following: a personal release, a location release, a music cue list, a shot sheet, an errors and omissions certificate, a synopsis, a script, a credits list, and a lower thirds license, wherein the intellectual property rights profile is associated with information regarding a production quality of master data for the media presentation, wherein the server module receives the information regarding the production quality of master data for the media presentation from a third party, wherein the master data for the media presentation is accessible by the third party, wherein the information regarding the production quality of the master data for the media presentation received from the third party relates to a change to increase the production quality of the master data for the media presentation.

29. A computer program product used with a processor, the computer program product comprising:
   a non-transitory computer usable medium having computer readable program code embodied therein that is used for generating an intellectual property rights profile associated with a creation of a media presentation, the computer readable program code including:
   computer readable program code used to display a list of at least one media presentation, wherein the list is specific to a user;
   computer readable program code used to receive a selection of a media presentation;
   computer readable program code used to display an intellectual property rights data entry template associated with the selected media presentation;
   computer readable program code used to receive, via a GUI module, data entered into the intellectual property rights data entry template by the user;
   computer readable program code used to generate the intellectual property rights profile of the media presentation using the received data via an intellectual property rights management module coupled to a server module, wherein the intellectual property rights management module processes the intellectual property rights data associated with the presentation for storage in a database coupled to a database module readable by the GUI module, wherein the server module is coupled to the database module, wherein the processing comprising analyzing the intellectual property rights information for the media presentation and generating the intellectual property rights profile for the media presentation; and
   computer readable program code used to display the generated intellectual property rights profile of the media presentation to the user via a presentation module coupled to the GUI module and the server module, wherein the intellectual property rights profile associated with the media presentation includes at least one of the following: a personal release, a location release, a music cue list, a shot sheet, an errors and omissions certificate, a synopsis, a script, a credits list, and a lower thirds license, wherein the intellectual property rights profile is associated with information regarding a production quality of master data for the media presentation, wherein the server module receives the information regarding the production quality of master data for the media presentation from a third party, wherein the master data for the media presentation is accessible by the third party, wherein the information regarding the production quality of the master data for the media presentation received from the third party relates to a change to increase the production quality of the master data for the media presentation.

30. A system for generating and displaying an intellectual property rights profile associated with a media presentation, the system comprising:
   a hardware processor and a memory operably coupled thereto, wherein the memory storing a set of instructions to execute via the hardware processor and thereby enable:
   a graphical user interface (GUI) module, wherein the GUI module enables a user to interact with and enter intellectual property rights information associated with a creation of the media presentation and displays a generated intellectual property rights profile based on such entering, wherein the generated intellectual property profile of the media presentation includes a copy or image of at least one of a personal release, a location release, a music cue list, a shot sheet, an errors and omissions certificate, a synopsis, a script, a credits list, publicity information, and a lower thirds license;
   a database module, readable by the GUI module, wherein the database module stores intellectual property rights information about the media presentation;
   an intellectual property rights management module coupled to the GUI module and the database module, wherein the intellectual property rights management module processes the intellectual property rights information associated with the media presentation for storage in the database module, wherein the processing comprising analyzing the intellectual property rights information for the media presentation and generating the intellectual property rights profile for the media presentation;
   a server module, communicatively coupled to the database module, the intellectual property rights management module, and the GUI module, wherein the server module retrieves intellectual property rights information associated with the media presentation from the database module, processes the intellectual property rights information and transmits the intellectual property rights information to the presentation module for display as the intellectual property rights profile; and
   a presentation module, communicatively coupled to the GUI module and the server module, wherein the presentation module displays the intellectual property rights profile as generated by the GUI module, wherein the intellectual property rights profile is associated with information regarding a production quality of master data for the media presentation, wherein the server module receives the information regarding the production quality of master data for the media presentation from a third party, wherein the master data for the media presentation is accessible by the third party, wherein the information regarding the production quality of the master data for the media presentation received from the third party relates to a change to increase the production quality of the master data for the media presentation.

31. The system of claim 30, wherein the intellectual property rights information includes intellectual property rights data related to the media presentation and an uploaded document related to the intellectual property rights profile of the media presentation, wherein the intellectual property rights profile is consolidated based on
- receiving the intellectual property rights data related to the media presentation,
- receiving the uploaded document related to the media presentation, and
- consolidating the received intellectual property rights data and the uploaded document into the consolidated intellectual property rights profile.

* * * * *